United States Patent [19]
Richter et al.

[11] Patent Number: 4,658,194
[45] Date of Patent: Apr. 14, 1987

[54] CLOSED LOOP CONTROL CIRCUITRY FOR STEP MOTORS

[75] Inventors: Ludwig Richter, Rheinhausen; Werner Siefert, Kippenheim; Hans-Jorg Kleis, Lahr, all of Fed. Rep. of Germany

[73] Assignee: Gerhard Berger GmbH & Co. KG, Lahr, Fed. Rep. of Germany

[21] Appl. No.: 697,567

[22] Filed: Feb. 1, 1985

[30] Foreign Application Priority Data

Feb. 7, 1984 [DE] Fed. Rep. of Germany ....... 3404127

[51] Int. Cl.[4] .............................................. H02P 8/00
[52] U.S. Cl. .................................... 318/696; 318/685
[58] Field of Search ............................... 318/685, 696

[56] References Cited

FOREIGN PATENT DOCUMENTS

| 1763055 | 8/1971 | Fed. Rep. of Germany . |
| 2161112 | 10/1972 | Fed. Rep. of Germany . |
| 2421219 | 11/1975 | Fed. Rep. of Germany . |
| 2447673 | 4/1976 | Fed. Rep. of Germany . |

OTHER PUBLICATIONS

Eighth Symposium on Incremental Motion Control, Kuo, Editor, Waveform Detection of PM Step Motors, Kuo et al., pp. 243–256, 1979.
"Closed-Loop Control of Step Motors Using Waveform Detection", by J. R. Frus and B. C. Kuo, Proceedings: International Conference on Step Motors and Systems, University of Leeds, Leeds, England, Jul. 13–15, 1976, pp. 44–53.
"Closed Loop Control of PM Step Motors by Sensing Back EMF", by T. Higuchi, Proceedings: Eleventh Annual Symposium on Incremental Motion Control Systems and Devices, Incremental Motion Control Systems Society, Champaign, Ill., May 1982, pp. 289–294.
"Analysis and Sinthesis of the Closed-Loop Stepping Motor Control System", by A. Keleman, V. Trifa and M. Crivili, Proceedings: Seventh Annual Symposium on Incremental Motion Control Systems and Devices, Incremental Motion Control Systems Society, Champaign, Ill., May 1978, pp. 359–368.
"Direct Detection of Back EMF in Permanent-Magnet Step Motors", by V. D. Hair, Proceedings: Twelfth Annual Symposium on Incremental Motion Control Systems and Devices, Incremental Motion Control Systems Society, Champaign, Ill., Jun. 1983, pp. 211–219.
"Closed-Loop Control of a 3.6 Floppy-Disk Drive PM Motor by Back EMF Sensing", by B. C. Kuo and K. Butts, Proceedings: Eleventh Annual Symposium on Incremental Motion Control Systems and Devices, Incremental Motion Control Systems Society, Champaign, Ill., May 1982, pp. 295–308.
"Damping of Step Motors", by B. C. Kuo, Incremental Motion Control, vol. II, chapter 8, pp. 215–233, SRL Publishing Company, Champaign, Ill.
"Closed-Loop Control of Step Motors", by B. C. Kuo, Incremental Motion Control, vol. II, chapter 9, pp. 234–255, SRL Publishing Company, Champaign, Ill.
"Closed-Loop Control By Current Sensing", by B. C. Kuo and A. Cassat, Incremental Motion Control, vol. II, chapter 10, pp. 256–289, SRL Publishing Company, Champaign, Ill.

Primary Examiner—William M. Shoop, Jr.
Assistant Examiner—Saul M. Bergmann
Attorney, Agent, or Firm—Norbert P. Holler

[57] ABSTRACT

Control circuitry for a self-synchronously driven step motor under closed loop control includes, for determining the rotor position, a technologically simplified back EMF waveform detector circuit which includes fewer than five operational amplifiers, and preferably only one operational amplifier, and which delivers, for each motor phase, a back EMF signal and the negative thereof. Use can be made of these signals individually or in various combinations, with the aid of a back EMF selector arrangement and an adder connected thereto, for controlling the stator field. By sum and difference formation of back EMF signals by the adder and by assigning such signals each to a respective energization state of the motor phases, the rotor can be moved by half-steps as well as full-steps, to provide a finer degree of control. Additionally it is possible with such circuitry to detect the end position of the rotor and its maximum degree of overrunning, which yield values that can be used for achieving desired damping of the rotor.

19 Claims, 16 Drawing Figures

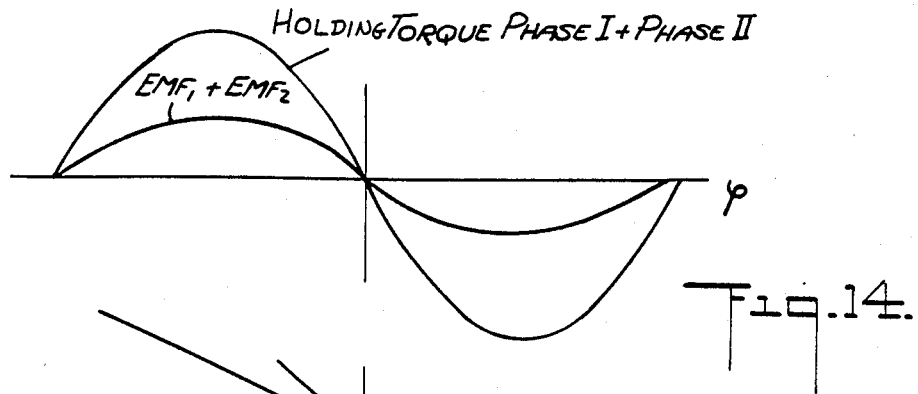
Fig.14.
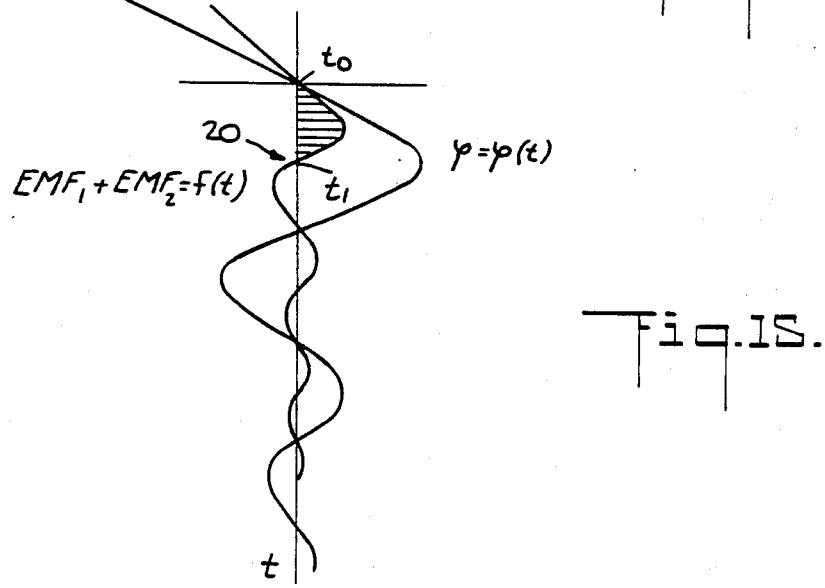
Fig.15.
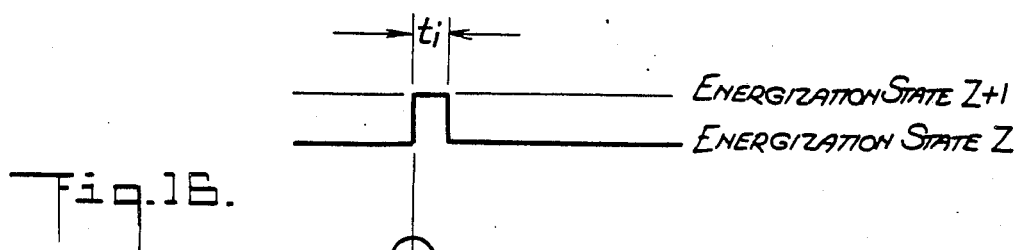
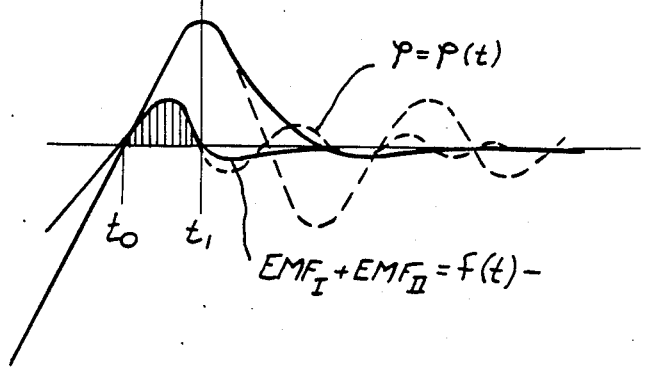
Fig.16.

CLOSED LOOP CONTROL CIRCUITRY FOR STEP MOTORS

This invention relates to control circuitry for step motors, and in particular to closed loop control circuitry for such motors.

Various types of control circuitry for a step motor of the multi-phase type and including a voltage inducing rotor, which circuitry enables a self-synchronized drive of the motor to be effected, are well known. One class of such known control circuitry utilizes a counter with an interconnected logic circuit for controlling the individual phases or drive stages of the motor, as well as a back EMF detector incorporated in a feedback control loop together with a back EMF selector for switching the system to different back EMF voltage waveforms corresponding to the individual motor phases, and a null point transition or zero-crossing detector, herein also referred to as a pulse shaper, responsive to the back EMF selector output.

Such known control circuitry for the self-synchronized drive of a step motor provides the appreciable advantage that a substantially better utilization can be made of the available motor dynamics. In contrast thereto, in the case of an open control for driving a step motor the control signal sequence must be so selected that the synchronization between the rotor and the stator fields is not lost. Achieving such a certainty, however, entails a reduction of the motor drive dynamics. Especially in the case of load variations it is essential that a sufficient signal spacing must be maintained for optimum high speed or braking sequences. As a rule the maximum frequency which a step motor in an open loop control circuit reaches is far (e.g. by a factor of 8 to 10) below the frequency which the motor could reach based on its dynamics. Accordingly, for the self-synchronized drive of the motor the rotor field is synchronized with the stator field, with the stator field controlling the sequential steps in dependence on the rotor field or the rotor position. This, of course, makes it necessary to have a precise detection of the rotor position.

Rotor position detectors for this purpose are well known, including some which are based on an optical sensing principle which sense and decode lines on a lined surface or plate. Such systems deliver a signal highly immune to distortion and are also independent of the step motor itself; their disadvantage is that they are very expensive and require additional space as well as an indispensable synchronization between the magnetic rotor position and the coding signal. Especially in the case of motors with small step angles, such an adjustment can raise great difficulties.

It is further known to detect the rotor position by analyzing the motor back EMF voltage waveforms. It is well known that in the back EMF waveforms of the motor there are contained all the necessary data required for an exact determination of the magnetic rotor position. The back EMF is a periodic function having a cycle duration corresponding to the rotor tooth division and in general has an almost sinusoidal form. The back EMF waveform and the holding torque waveform for each motor phase are in phase with one another.

For the purpose of generating a rotating stator field the motor phases must be cyclically reversed in order to ensure that at any given point in time the delivered motor torque has the same sign (plus or minus) as the back EMF voltage. This can be effected with the aid of the back EMF voltages, with their null point transitions being used in each case to effect the phase reversals. In this context a distinction is made in back EMF detection between the so-called direct and indirect methods. The direct method, in which the voltage is measured across one of the motor windings, is particularly disadvantageous in that a fully certain recognition of the null point transition is possible only at low motor frequencies and in that, furthermore, it leads to a reduction of the dynamic motor torque.

In the indirect method the aforesaid disadvantages are avoided. The detection of the back EMF voltages for each phase is in this method effected by means of an analog phase simulation according to the equation $$U_{EMF} = iR + L(di/dt) - u$$

In the heretofore known control circuits using back EMF waveform detection, the individual back EMF waveforms correspond to the instantaneous energization states of the motor. The back EMF selector arrangement in such a circuit switches continuously after each pulse, so that assuming a designation of the back EMF curves by the symbols $+1$ and $+2$ or $-1$ and $-2$, a sequence of $+1, +2, -1, -2, +1, +2, \ldots$ results. If it is then desired to change the dynamic load angle, the energization state can be changed in a known fashion by a so-called pulse injection. This, however, entails a change of the step angle by a full step. The switching pulse which would otherwise be applied at this point would lead to a change in the dynamic load angle by two full steps. The great torque variations resulting from such a change could, however, lead to interference with proper operation and could adversely affect the efficacy of the control. Accordingly, it has already been proposed to provide a time delay for the switching pulse in order to achieve a more gentle transition, but this approach has actually increased the technical requirements for the control. Such a time delay is liable to raise even greater problems when the motor frequency (speed of revolution) changes, because under such circumstances the delay must be continuously altered in a corresponding manner.

With the use of the previously mentioned pulse injection the superimposition of an additional pulse enables a back EMF null point transition to be simulated, so that in dependence on this additional pulse the motor is switched to the next energization state at an earlier point in time. In order to prevent the permissible load angle being exceeded, however, this additional pulse may be delayed somewhat by means of a time delay arrangement. When using the pulse injection, care must also be taken that each of the added pulses in each cycle is designed for the exact performance of a prescribed number of steps, in order to avoid possible position errors.

It is the principal object of the present invention, therefore, to provide a control circuit of the closed loop type which enables a fine tuned control of the dynamic motor torque to be achieved with relatively little technical difficulty even when the motor is to be accelerated or braked with a maximum possible torque.

It is also an object of the present invention to provide such a control circuit which enables a higher degree of certainty of operation to be achieved and especially enables step or positioning errors to be avoided.

It is a still further object of the present invention to provide a control circuit which with little technical difficulty facilitates an improvement of the damping of the motor for the purpose of shortening the duration of the rotational movement of the rotor upon attainment of the desired end position thereof.

For the attainment of these objectives, the present invention contemplates on the one hand that the back EMF selector includes an analog switching device for selective transmission of individual ones or combinations of back EMF voltage waveforms and that between the back EMF selector and the pulse shaper or zero-crossing detector an adder circuit is inserted for generating addition or subtraction curves from the individual back EMF voltage curves, so that control signals can be generated which represent half-step positions as well as full-step positions of the rotor and which can be evaluated by the control circuitry for optimizing the motor torque. Thus the present invention makes it possible not only to recognize from the back EMF signals full-step positions based on the zero-crossing points or null point transitions of the back EMF voltage waveforms, but also to recognize half-step positions with the aid of the adder circuit from the back EMF sum and difference curves. As a consequence a fine control is rendered feasible with very little difficulty, so that a pulse time delay is not longer required. Furthermore, the invention also makes it possible, without any substantial additional difficulties, that even at the rotor end position past the null point transitions of a back EMF sum or difference curve, the time point at which the end position is reached as well as the time point of the first maximum overrunning is available for use to enable a desired degree of damping to be achieved.

For the purpose of an indirect back EMF detection, for which a circuit corresponding to the equation $$U_{EMF} = iR + L(di/dt) - U$$

is used, it has already been proposed to utilize a switching circuit which as needed includes, among other things, five operational amplifiers. This entails the particular disadvantage, however, that over and above the requisite space requirements the large number of operational amplifiers magnifies signal deviations and resultant distortions created by the presence of offset or spurious voltages. The same drawback is noticeable especially in the case of low input voltages such as are present at low speeds of rotation of the motor.

In accordance with the present invention, therefore, it is proposed that the back EMF detector be essentially constituted by an analog computing circuit with fewer than five operational amplifiers. Preferably the arrangement is such that the analog computing circuit is only provided with one operational amplifier which is arranged as an addition and subtraction amplifier with a differentiating path and includes a voltage measuring path (iR), a differentiation path with addition $$\left( L \frac{di}{dt} \right)$$

as well as a subtraction path (−U). Such a circuit arrangement not only substantially minimizes the space requirements but at the same time has the advantage that any errors occurring remain negligibly small and for all practical purposes do not falsify the measurement. By virtue of the present invention, despite substantially reduced space requirements and costs a system characterized by improved electrical properties is provided through which a problem-free and operationally secure driving of the motor becomes possible.

In accordance with another aspect of the present invention, a damping control is provided which includes an integrator or the like capable of being switched in and out by means of a back EMF signal for the purpose of detecting the kinetic energy of the rotor or a value proportional to that energy, which serves for initiating a proportional damping action. It will be apparent, therefore, that the aforesaid value which is proportional to the kinetic energy state of the rotor can advantageously be used for achieving a desired degree of damping. Preferably in such an arrangement the damping system is provided with control inputs, on the one hand for receiving from the adder a back EMF signal which is in phase with the holding torque of the motor and on the other hand for recognizing the last energization state switchover that has occurred within a given operating cycle, and the damper further has a control output connected with the logic switching circuit, e.g. a PROM, for further shifting the energization state to an energization state following the last one of the operating cycle. The possibility of generating sum and difference (addition and subtraction) back EMF signals facilitates assigning to the holding torque waveform a back EMF waveform in phase therewith. The null point transitions of this back EMF curve constitute, on the one hand upon an overriding of the end position of the rotor and on the other hand at the rotor's first maximum overriding movement, precisely defined measuring points which are detectable by the control circuitry according to the present invention. At the same time, the information relating to the kinetic energy state of the rotor is available for use together with the information relating to the rotor position. Advantageously the integrator can be switched in and out of the system in accordance with the null point transitions of the back EMF waveforms or the back EMF addition waveforms, with the contents of the integrator being a proportional measure of the energy content of the rotor at the amplitude of the first overrunning of the desired end position. A value corresponding to the energy content of the rotor at the first overrunning amplitude is obtained by simple integration with the two back EMF signal null point transitions as the integration limits, so that the desired damping steps can be taken on the basis of this detected magnitude.

The foregoing and other objects, characteristics and advantages of the present invention will be more clearly understood from the following detailed description thereof when read in conjunction with the accompanying drawings, in which:

FIG. 14 is a graphic representation of the waveforms of the motor holding torque and of the back EMF voltages in phase therewith in the region of the end position stage;

FIG. 15 is a graphic representation of the waveforms of the rotor position as well as the associated back EMF voltage waveforms during the overrunning oscillation stage; and FIG. 16 is a graphic representation, somewhat similar to FIG. 15, of the waveform of the rotor position but showing the additional waveform encountered during active damping.

Figure 1:
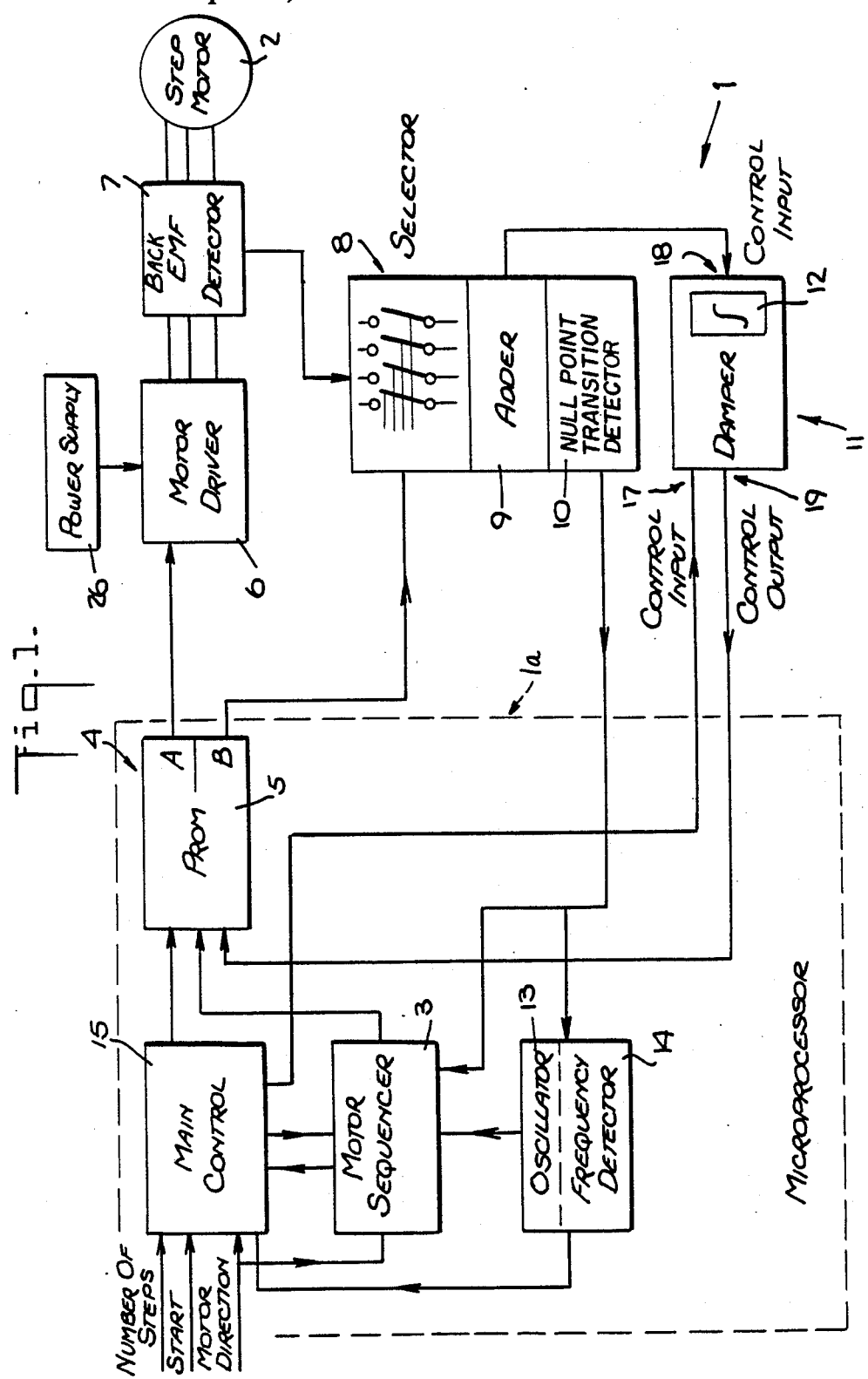
FIG. 1 is a block diagram of a closed loop control circuit for a step motor in accordance with the present invention.

Referring now to the drawings in greater detail, FIG. 1 illustrates schematically, in the form of a block diagram, the control circuitry 1 for controlling a step motor 2. The step motor 2 is here shown to be driven self-synchronously under the control of a closed or feedback loop, with the stator field of the motor being switched from one phase to the next in dependence on the position of the rotor. Insofar as its dynamic characteristics are concerned, therefore, such a step motor 2 approximately resembles a DC motor.

In essence the control of the motor is effected by a microprocessor 1a incorporated in the feedback control loop and including a motor sequencer or counter 3 and a logic switching device 4, here shown in the form of a PROM 5, one of the outputs of which, designated A, is connected to the motor-driver/phase shifting means 6. The feedback control loop further includes, in addition to the microprocessor, a back EMF waveform detector 7, a back EMF selector device 8 in the form of an analog switching arrangement, an adder 9 connected to the output of the back EMF selector, and a comparator or pulse shaper 10 connected to the output of the adder and to an input of the motor sequencer or counter 3. The system further includes a damper 11 having an integrator 12 associated therewith, the damper being connected between an output of the adder 9 and an input of the PROM 5. The feedback control loop also includes an oscillator 13 and an associated frequency detector 14 jointly constituting a signal generating means which receives outputs of the pulse shaper 10, and a main control device 15 which is connected with both the signal generating means and the motor sequencer or counter 3, the elements 13, 14 and 15 also constituting parts of the microprocessor. The microprocessor in toto can be designated control circuit means.

Figure 2:
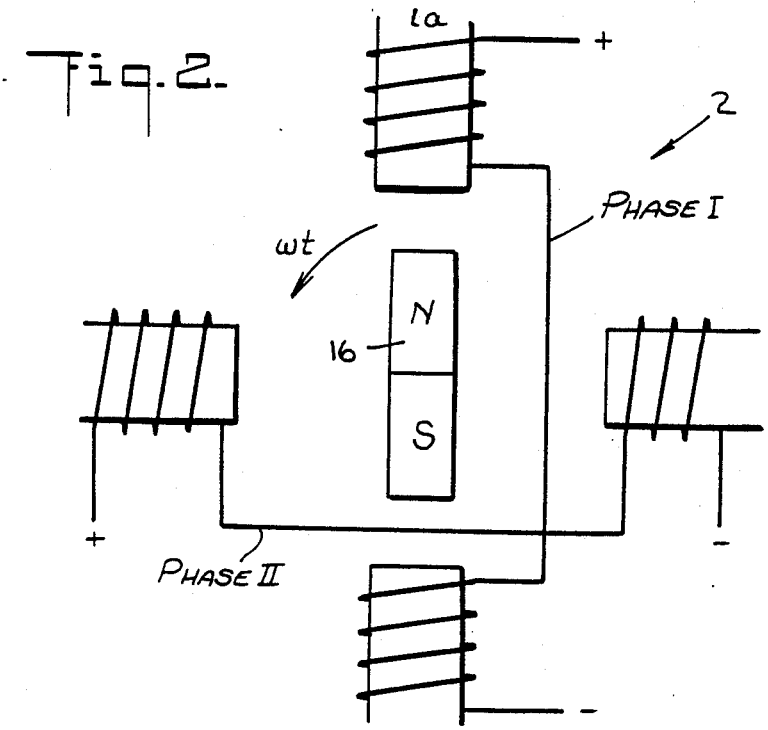
FIG. 2 is a schematic illustration of the rotor and stator of a two-phase step motor.
Figure 3:
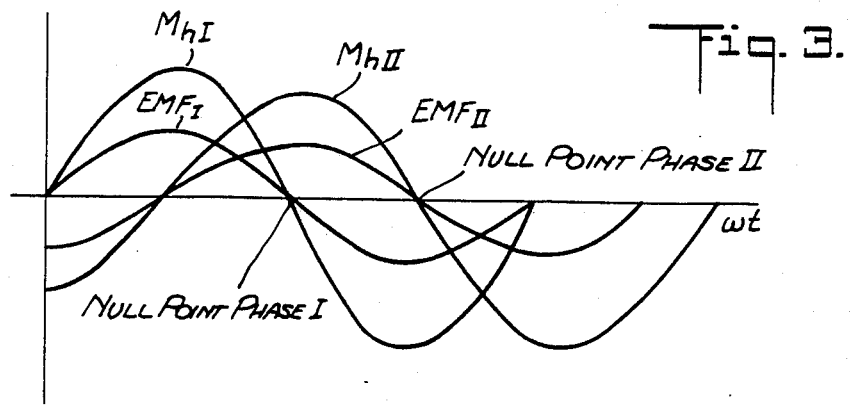
FIG. 3 is a graphic representation of the motor torque waveforms and the associated back EMF waveforms.
Figure 4:
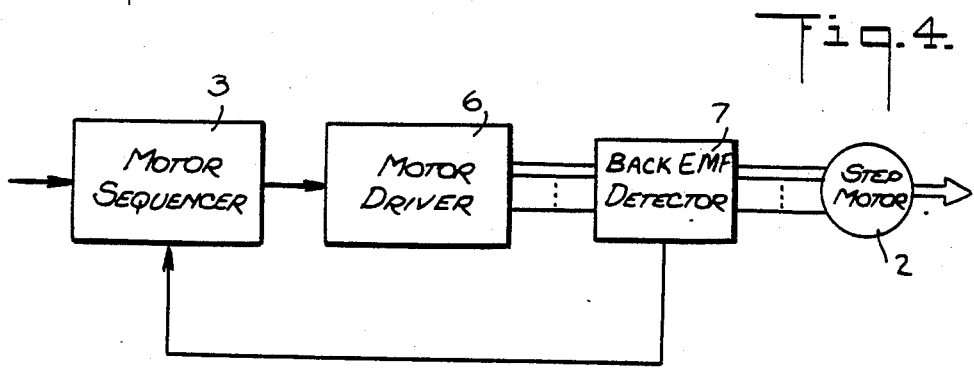
FIG. 4 is a simplified block diagram of a self-synchronously driven step motor.

The manner of operation of a step motor, such as that designated by reference numeral 2 in FIG. 1, may be briefly explained with reference to FIGS. 2-4. Thus, FIG. 2 schematically illustrates the motor as having two phases or windings I and II wound on the stator, and a permanent magnet rotor 16. The waveforms of the motor torques $M_{hI}$ and $M_{hII}$ and of the associated back EMF voltages $EMF_I$ and $EMF_{II}$ are shown in FIG. 3. As can be readily seen, the back EMF waveforms as well as the motor torque waveforms are generally sinusoidal and are in phase with each other. The motor phases must, of course, be switched over in each case at the zero-crossings or null point transitions of the back EMF voltages, in order to ensure that at each point in time the delivered motor torque has the same arithmetic sign. The load angle of each phase (the electric phase angle between the actual rotor position and the stable rest position thereof) thus is 180°. In the case of a two-phase motor, this corresponds to two motor steps, i.e. two full-steps. As shown in FIG. 4, the step motor 2 is driven self-synchronously. To this end, the position of the rotor 16 is sensed by the back EMF waveform detector 7 and a corresponding signal is then fed back into the motor sequencer 3 when a null point transition of the back EMF voltage waveform occurs. Only thereafter is the motor switched to the next energization state of the phases through the motor sequencer 3.

Figure 8:
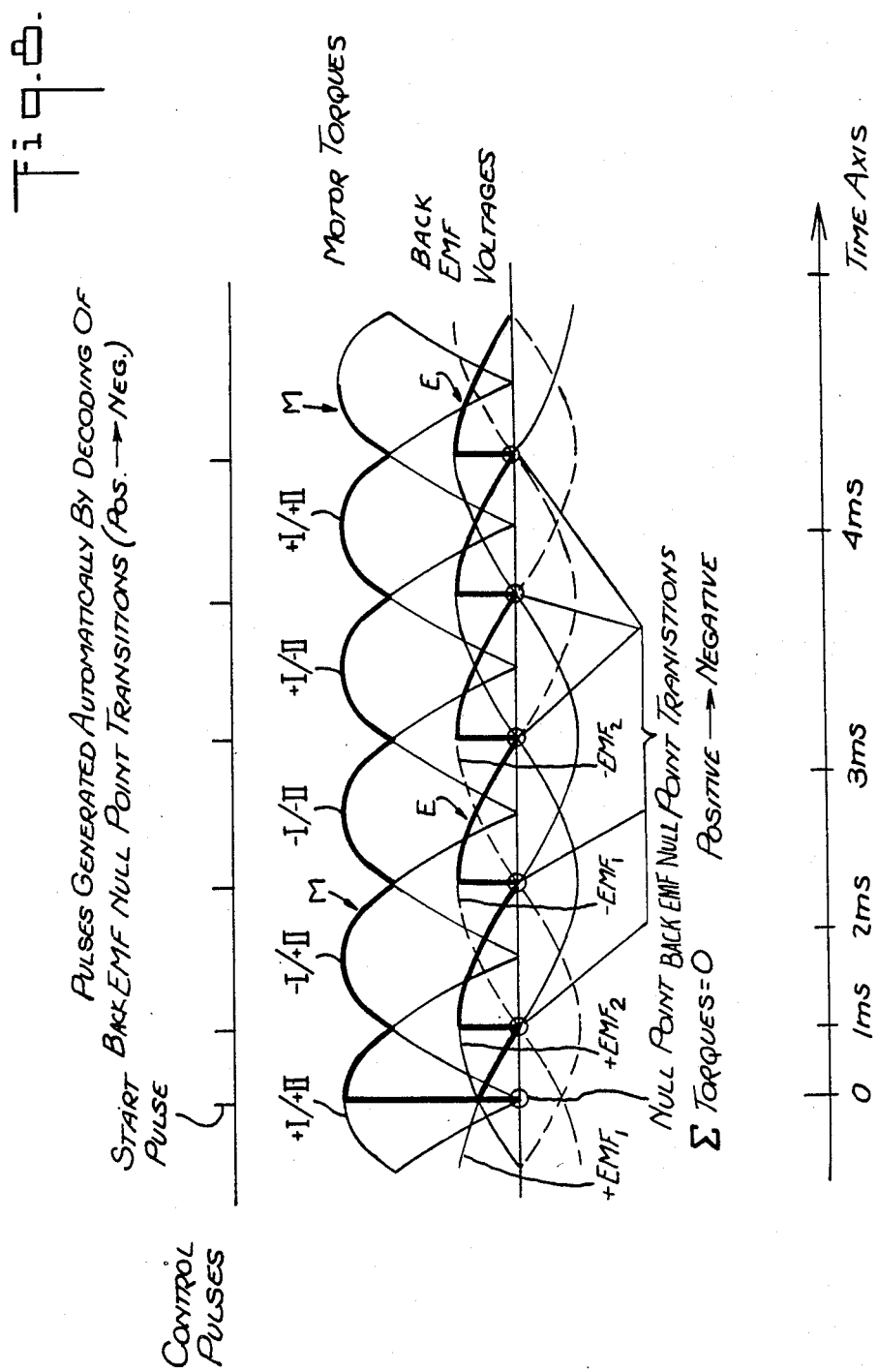
FIG. 8 is a graphic representation of the motor torque and back EMF waveforms at low motor speeds and high torque delivery.

Referring now to FIG. 8, the same shows the torque waveform of a two-phase motor with two simultaneously energized phases or windings I and II, with the switching over occurring in each instant at the null point transition of the back EMF voltage. The illustration represents a quasi-steady state operation of the motor, i.e. at a continuously small rotor speed or at negligible electric motor time constants. The motor torques M and the EMF voltages E for the four energization states $+I/+II$, $-I/+II$, $-I/-II$ and $+I/-II$ (etc.) are here shown for the two phases. It can be readily seen, therefore, that in each case the zero-crossing or null point transition of the respective back EMF voltages from positive to negative, i.e. from $+EMF_1$ to $-EMF_1$ and from $+EMF_2$ to $-EMF_2$, is used for effecting the switching over from any given energization state to the next succeeding one. The same cyclical change-over of the four energization states for a full revolution of the described two-phase motor is then repeated for each succeeding rotation.

The feedback control loop operation according to the present invention will, it is believed, be best understood from the following description of the essential functions of the individual components of the circuitry shown in FIG. 1.

1. The motor-driver 6 provides the phase-shifting stages by means of which current is fed from a suitable power supply 26 to the motor windings in accordance with the respective desired energization states thereof. The motor-driver 6 is activated by an appropriate signal coming from the output section A of the PROM 5.

2. The back EMF detector 7 senses the back EMF waveforms which contain the data on the position and speed of rotation of the rotor, separately for each phase. In addition the derived signals are also negatived, so that in the case of a two-phase motor four output signals are available for use as back EMF voltage waveforms.

3. The back EMF selector 8 in essence comprises a 4-part analog switching device for transmitting one or more of the four output signals fed into the selector 8 from the back EMF detector 7. The activation of the selector 8 is effected by means of a signal taken from the output section B of the PROM 5.

4. The adder 9 generates both sum as well as difference signals from the back EMF waveforms passed by the back EMF selector 8.

5. The pulse shaper or zero-crossing detector 10 is in essence a comparator which decodes from positive to negative each null point transition of the back EMF signal arriving from the adder 9. At each such null point transition a pulse is fed from the output of the pulse shaper 10 to one of the inputs of the motor sequencer or counter 3.

6. The motor sequencer 3 is in essence a forwards/backwards counter (ring counter) from which successive output signals are fed into the PROM 5 to cause the same to send a signal to the motor-driver 6 so as to shift the motor phases into the next energization state.

7. The damper 11, with which the integrator 12 is associated, receives a signal from the adder 9 and thus senses the instantaneous rotor position and evaluates the overrunning amplitude, i.e. the extent to which the rotor has moved past its intended end position.

8. The oscillator 13 and frequency detector 14 constitute an arrangement by which the motor frequency during braking is compared with a fixed prescribed frequency. When the motor frequency is less than the fixed prescribed frequency, the motor drive is switched from the closed loop (self-synchronous) drive into a controlled drive. The oscillator 13 provides the frequency at which the motor executes the remaining number of steps of the desired total number of steps, it being understood that this frequency is smaller than the maximum stop frequency.

9. The logic switching means 4, i.e. the PROM 5, defines the relationship between the energization states of the motor (the conditions under which current is permitted to flow through the motor windings) and the back EMF waveform selection effected by the analog switching means 8 for the various drive stages of the motor. In the embodiment of the present invention here under discussion, involving the operation of a two-phase motor, the PROM 5 thus makes provision for four energization states as well as eight back EMF waveforms.

It should be noted, in this regard, that it is the motor-driver/phase-shifting means 6 which drives the step motor 2. To this end, the motor-driver receives from the PROM 5, via the output section A of the latter, digital signals that determine which phase windings are to have current flowing therethrough and also the direction of the current flow. Thus, this aspect of the operation can be described as a digital selection of one of the four possible motor energization states. At the same time, the PROM 5 determines, by digital signals applied via its output section B to the back EMF selector 8, which of the eight possible sinusoidal back EMF waveforms is to be passed through the adder 9 and the pulse shaper 10 and thereby caused to ensure the emission of the proper digital signal by the PROM 5 for effecting the upcoming shifting of the motor from one energization state to the next. In other words, at each given instant the PROM 5 chooses, via its output section A, one of the four energization states and concurrently chooses, via its output section B, one of the eight back EMF voltage waveforms, the selected outputs being those which are to be used for shifting the motor to its next succeeding energization state.

10. The main control 15 provides an output of the start pulse, an instantaneous count of the motor steps and a comparison thereof with the intended total number of steps, and the calculation of the braking point (i.e. the point at which the rotor should begin to be slowed down in order to be at the proper end position at the conclusion of the last desired step), as well as the switching over from a closed loop drive to a controlled drive during the braking operation. Over and above the foregoing, the main control 15 addresses the PROM 5 for the different operational stages of the motor, namely acceleration, braking, constant frequency, and damping, during both right-hand and left-hand running. To this end, therefore, the PROM 5 includes in its memory a number of different assignments of energizations states to back EMF voltage waveforms, which are used, depending on the then existing operational stages (acceleration, braking, etc.) of the motor, to drive the motor. The selection of any such assignment, it will be understood, is effected by the main control 15.

Figure 9:
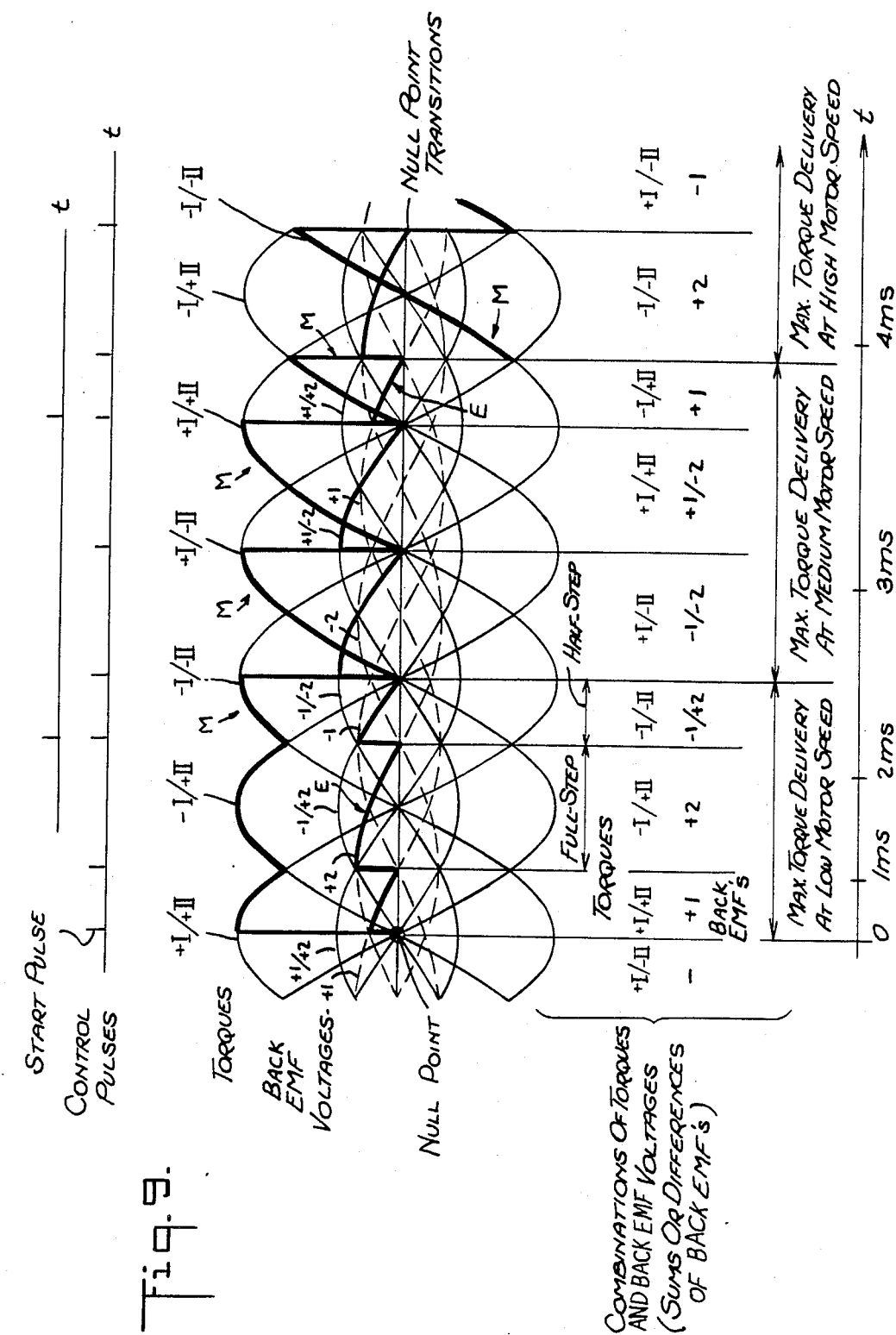
FIG. 9 is a graphic representation, similar to FIG. 8, of the motor torque and back EMF waveforms but shows the same with the waveforms and their transitions at low, medium and high motor speeds and maximum torque delivery.

For the purposes of a description of the closed loop step motor control according to the present invention, it is assumed as a starting point that the motor is already continuously in self-synchronous operation. The input to the loop is taken to be the outputs from the section A of the PROM 5. These signals provide the information as to which energization state is to exist in the motor windings and input the appropriate instructions to the motor-driver or phase-shifting device 6. The phase currents are modulated based on the back EMF voltages. The back EMF voltage waveforms of each individual phase are detected by the EMF detector 7, which immediately renders available two back EMF voltage waveforms. Each of these is then negatived, so that in total four back EMF signals are fed to the back EMF selector device 8. The analog switching arrangement in the back EMF selector device 8 is such that one or a combination of more than one of the back EMF voltage waveforms can be passed through. Thus, as can be seen in FIG. 9, by utilizing combinations of two back EMF voltages there are available for use eight possible back EMF voltages in all, namely the four individual back EMF voltages designated $+1$, $+2$, $-1$, and $-2$, and the four combinations $+1/+2$, $-1/+2$, $-1/-2$, and $+1/-2$. Which one or more of these back EMF signals is passed on to the adder 9, of course, depends on the instructions issued by the PROM 5 at its output section B. For the purposes of the following discussion, the instructions available at the output sections A and B of the PROM 5 are in the first instance precisely predetermined.

The waveforms corresponding to the above-identified eight back EMF voltages are available at the outputs of the adder 9 corresponding to the disposition of the analog switching arrangement of the EMF selector device 8. When fed into the pulse shaper or zero-crossing detector 10, the latter through its comparator decodes the null point transition of each back EMF signal as it goes from positive to negative and outputs a pulse which is fed into the motor sequencer or counter 3. Depending on the number to which the latter has counted up to that point, the address of the PROM is upped by 1. This provides at the output section A of the PROM 5 a signal for the next energization state of the motor, for example to shift the same from the state $+I/+II$ to $-I/+II$ as shown in FIG. 8, and a signal is provided at the output section B of the PROM 5 to shift the analog switching arrangement in the back EMF selector 8 for a different back EMF voltage waveform selection, for example from +1 to +2. Upon completion of these operations, the motor has completed one step, and the progress of signals through the closed loop then begins anew.

In addition, the possibility provided by the present invention of generating sum and difference curves with the aid of the adder 9 leads to the further result that positions between the individual back EMF null point transitions can be decoded as previously described, so that the switching angle can be cut in half, i.e. that the motor can be stepped by half-steps rather than full-steps.

Figure 7:
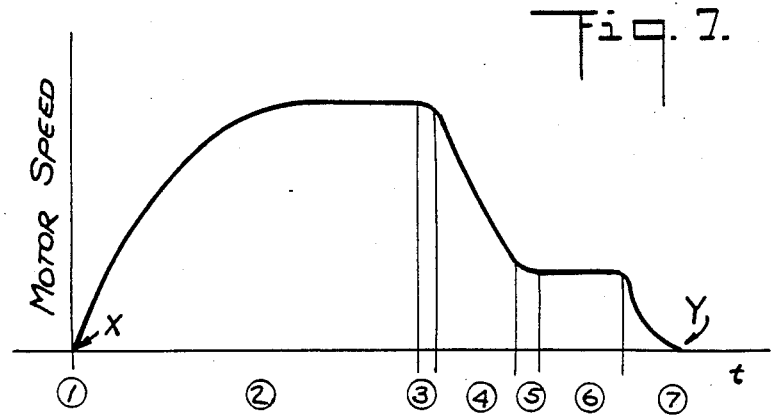
FIG. 7 is a graphic representation of the operating cycle of a step motor.

The graph of FIG. 7 shows the plot of a step motor operating cycle which can be performed with the control circuitry of the present invention. It will be understood by those skilled in the art that if a step motor is to be shifted from a position state X to a position state Y, it must be first accelerated and then braked. The tasks which the control circuitry must perform for this purpose are discernible from the indicated portions (designated by circled numerals) of the operating cycle. The various portions of the cycle are as follows:

① designates the starting mode.
② desinates a first region of acceleration and a second region of constant speed.
③ designates the switching from the acceleration/constant speed mode to a braking mode.
④ designates the braking mode.
⑤ designates the switching over to the stop frequency.
⑥ designates the stop frequency.
⑦ designates the active damping of the rotor movement so as to have the rotor come to rest at the desired end position.

The motor torque and back EMF voltage waveforms associated with the aforesaid individual portions of the motor operating cycle are illustrated in FIGS. 8–16. Of these, FIG. 8 shows the static condition at the start of the cycle. In order to start the motor, it is necessary to apply to the main control 15 (FIG. 1), either manually or by means of an external control, a start pulse which also designates the desired number of motor steps and the desired direction of rotation of the motor. The main control 15 then generates a suitable number of pulses, i.e. at least one pulse, to activate the counter or motor sequencer 3 to shift the energization state of the motor 2 correspondingly. A positive torque is, therefore, generated which accelerates the rotor out of its stationary position. Once the start pulse has been applied, of course, the control circuitry itself generates all further pulses. In the various graphic representations, for ease of comprehension, the motor torque waveform sections M as well as the associated back EMF voltage waveform sections E are shown and emphasized in heavy lines. FIG. 8 and part of FIG. 9 represent a switching or step angle which is characterized by a delivery of a maximum positive torque at a low motor speed. The relationship between the energization state (the signals at the output section A of the PROM 5) and the disposition of the analog switch arrangement 8 (the signals at the output section B of the PROM) is fixed for this step angle. If the step angle is to be changed, for example in order to deliver maximum torque at medium motor speeds, then the relationship between the energization state (e.g. −I/+II) and the back EMF selection (e.g. +2) must be changed. FIG. 9 shows the enlargement of the step angle in half-steps, which ensures attainment of a high degree of operational precision and that step errors for all practical purposes cannot occur. The enlargement of the step angle by a half-step is effected by a different association of a back EMF voltage curve to the existing energization state. As shown in FIG. 9, the energization state −I/+II is followed by the energization state −I/−II, and the corresponding associated back EMF voltage curve (cf. FIG. 8) would in the case of an unchanged step angle be −1/+2. As shown in FIG. 9, however, for the energization state −I/−II the back EMF voltage is switched to −1/−2, so that as a result an earlier null point transition of this back EMF voltage occurs. The subsequent relations between the energization states and back EMF voltages is then again such that full-steps are executed.

In further sections of the graph shown in FIG. 9 there is represented a further switching to a different step angle in which a maximum torque delivery at high motor speeds is possible. This again occurs by the establishment of correspondingly different relations between the energization states and the back EMF voltages.

Above the graph of FIG. 9 are additionally shown two time axes onto the lower one of which have been entered, corresponding to the graph, the control pulses generated by the back EMF null point transitions or zero-crossings, and onto the upper one of which have been entered the two pulses for switching the system to different load or step angles. The switching pulses and the correlation of the outputs of the PROM section B to the outputs of the PROM section A are provided by the main control 15. At what points in time these command pulses are applied depends on the motor and load parameters as well as on the frequency. In the PROM 5 are stored all possible relations between the four energization states of the motor here under discussion as well as the eight back EMF voltage waveforms.

From the foregoing it will be appreciated that for an optimum driving of the motor for each given motor speed the back EMF selection can be changed in dependence on the energization state. Through this expedient it is possible at increasing motor frequency to adapt the influence of the electric motor time constants to the dynamic load angle. For lower motor frequencies and small time constants a load angle according to FIG. 8 may be selected, i.e. the null point transition of an individual back EMF voltage can be used for determining the switching over time point. For maximum starting acceleration the motor control is effected afte the back EMF selection. As the motor frequency increases, the system is then switched to back EMF selection according to FIG. 9. The generation of back EMF voltage curves by addition or subtraction then permits the increase or the decrease, respectively, of the dynamic load angle in half-steps. If the dynamic load angle were to be suddenly changed by a full-step, this could lead to interference and distortions. The acceleration stage is completed when the motor torque and the load torque are in equilibrium or when the motor frequency is limited by external means.

Figure 10:
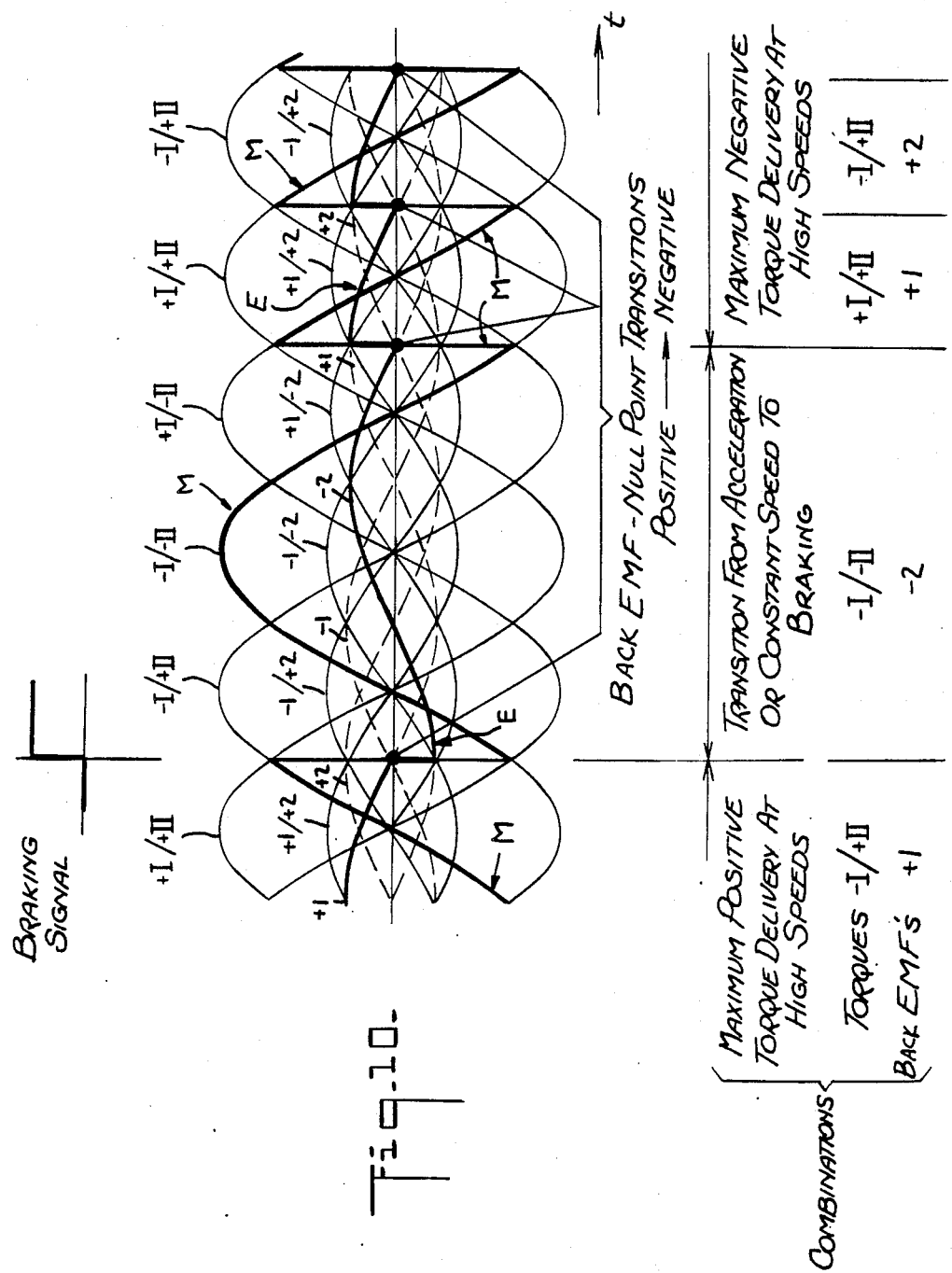
FIG. 10 is a graphic representation of the waveforms for the motor torques and back EMF voltages at the transition from high motor speed and maximum positive torque delivery to maximum negative torque delivery.
Figure 12:
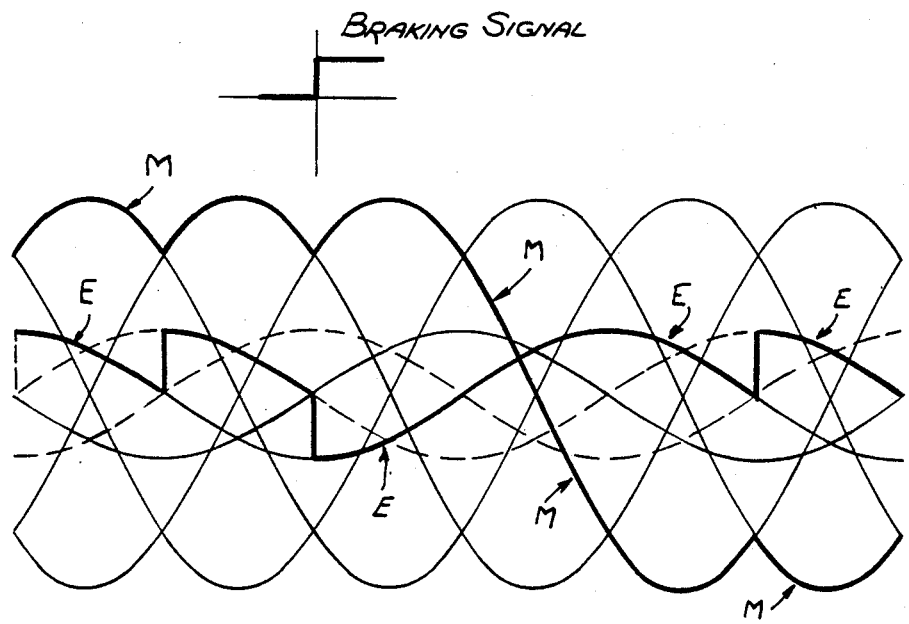
FIGS. 12 and 13 are graphic representations of different transition phases from positive to negative torque delivery.
Figure 13:
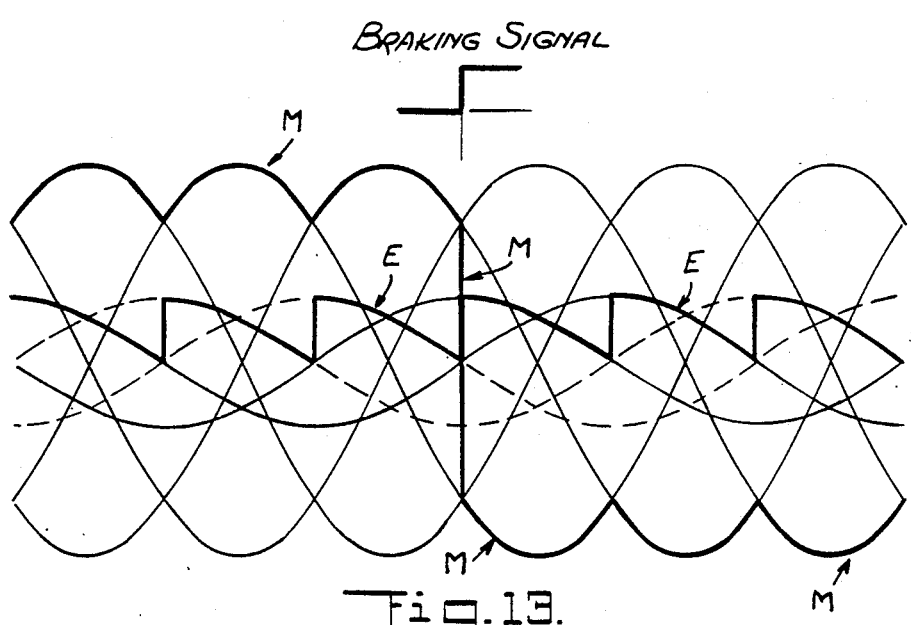

There are two possible ways of switching over from the acceleration/constant speed mode to the braking mode. FIGS. 10 and 12 show a continuous transition from acceleration to braking, which is attained by virtue of the fact that after the setting of the braking signal a different back EMF voltage, namely −2 (instead of +2), is associated with the instantaneous energization state −I/−II (FIG. 10). Another possible way of effecting a sudden switching over is that a different energization state is associated with the back EMF voltage curve following the braking signal, as is shown in FIG. 13. Here it can be readily recognized that the back EMF voltage curve sections used in any given instance continue uninterruptedly. Both of these ways of switching over can be implemented with the control circuitry according to the present invention, since the selection of relationships between the back EMF voltages and the energization states can be achieved through the main control 15 by the PROM 5.

Figure 11:
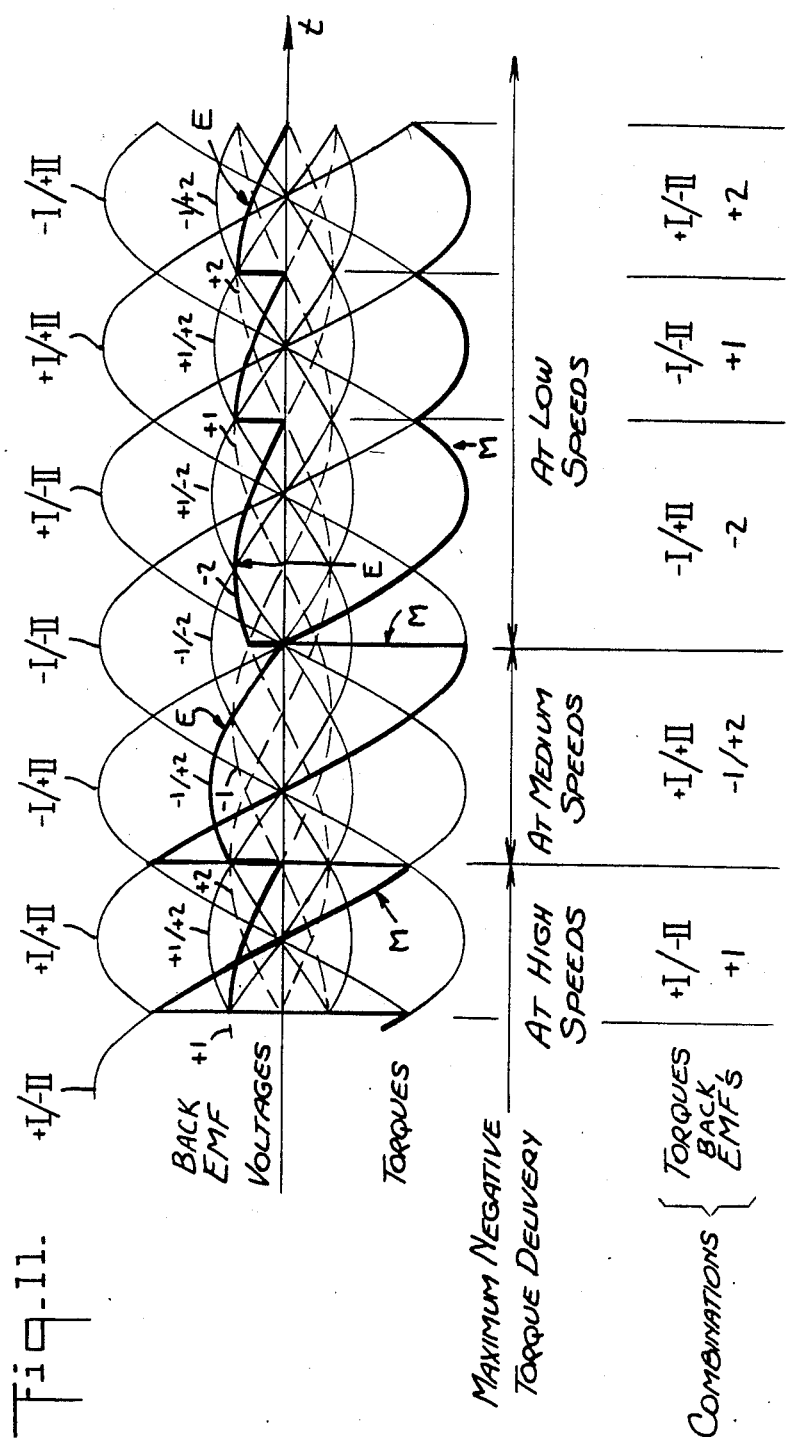
FIG. 11 is a graphic representation of the waveform of the motor torque at maximum negative torque delivery at high motor speed, medium motor speed and low motor speeds.

In the graph of FIG. 10 it can be seen that the region of the transition from acceleration to braking is immediately followed by a region characterized by a maximum negative motor torque delivery at high motor speed for braking purposes. The relation between the back EMF voltages and the energization state in the braking mode generally differs by 180° from the relation between the back EMF and the energization state in the acceleration mode. In the graph of FIG. 11 it can be seen that sections with torque waveforms follow the region of transition from acceleration to braking, in which corresponding to the existing motor speed differen torque sections can be achieved by different relations between the existing energization state and the back EMF voltage.

It should be noted that after the braking mode (item ④ of FIG. 7) the step frequency is smaller than or equal to the stop frequency, at which the motor can come to a halt within one step. In order to enable this to be achieved also with oscillating loads, the braking phase must be initiated at exactly the correct time. In order to ensure that the motor will nevertheless reach its desired end position Y, it is necessary that when the actual frequency is less than a prescribed frequency the remaining motor steps must be effected at a constant frequency which is smaller than or equal to the stop frequency. It is this operational mode which is represented by item ⑥ in FIG. 7. In order for the motor to go in a continuous transition from the braking mode with maximum torque to a constant frequency less than the stop frequency, the dynamic load angle must be changed, which again is rendered possible by the relations between different back EMF voltages or their sums or differences. Because of the current rise time constants the motor would otherwise not be capable of counteracting the high negative torque rapidly enough.

FIG. 1 shows that the damper 11 is provided with two control inputs 17 and 18, of which the control input 18 serves for receiving the back EMF signal generated by the adder 9 and lying in phase with the holding torque, while the control input 17 serves for receiving a signal corresponding to the last energization state shift within a given operational cycle. The damper 11 further has a control output 19 connected to one of the inputs of the PROM 5, by means of which a further shifting of the energization state to an energization state following the last energization state of an operational cycle can be effected.

The in-phase arrangement of the motor torque and the back EMF voltage is further rendered possible by virtue of the fact that sums and differences can be formed by the adder 9 from the available back EMF voltage curves. This makes it possible without further difficulty to achieve desired damping effects. For this purpose there can be derived from the waveform of the motor back EMF not only data about the position of the rotor but also data about the energy content of the rotor. This is the basic prerequisite for the implementation of controlled active damping effects. It can be seen from FIG. 14 that the holding torque of the motor $(+I/+II)$ is in phase with a back EMF voltage curve $(+1/+2)$. Through this in-phase arrangement it is possible to derive the rotor position directly from the back EMF null point transitions.

In the graph of FIG. 15, the rotor position has been plotted as the abscissa versus a time axis t as the ordinate. The time axis simultaneously represents the rotor end position. During its hunting stage the rotor oscillates about the stable rest position of the rotor at the last occurring energization state of the motor. During the said hunting stage the back EMF signal $(+1/+2)$ has a frequency twice the oscillating frequency of the rotor. The first null point transition at the intersection of the coordinates corresponds to the desired end position of the rotor. At the next null point transition of the back EMF signal, i.e. at the point 20, the rotor has attained its first maximum degree of overswinging. It can be readily recognized here that on the one hand the rotor position can be determined by the null point transitions of the back EMF signal and that on the other hand the back rotor energy can be determined by means of a simple integration of the EMF signal over a time interval between the first null point transition and the null point transition 20. In the further portions of the curves, every second null point transition of the back EMF signal is identical with the rotor end position, while the respective intermediate null point transitions in each case represent the amplitude of the overswinging movement.

By means of the previously mentioned integration utilizing the two back EMF signal null point transitions as the limits of integration, a value can be reached which is proportional to the energy content of the first overswinging amplitude, as is indicated in the hatched section of the back EMF curve. The thereby implemented damping effects can, for example, also be achieved through the known principle of "back phase damping."

FIG. 16 shows the wave form corresponding to the rotor position, which wave form exists when the desired damping effects are present. The hatched section of the wave form in FIG. 16 corresponds approximately to the hatched section in FIG. 15. The damper 11 (FIG. 1) includes an integrator 12 in order to enable the control value for the desired damping effects to be formed. The results of the integration between the limits $t_0$ and $t_1$ is a measure of the time interval over which damping must be performed. In FIG. 16 the last energization state is designated Z, while the next succeeding energization state which generates an additional torque is designated $Z+1$. When the rotor has achieved the maximum degree of its first overswinging movement, the damping action is instituted through a switching to the energization state $Z+1$ for the time interval $t_i$, for which purpose $t_i$ is proportional to the integrator content. Through this predetermined damping operation the overswinging movement is materially shortened, as can be recognized from the solid-line curve representing the rotor position.

The back EMF detector 7 includes as its detection means a circuit arrangement corresponding to the equation $$U_{EMF} = iR + L(di/dt) - U$$

Figure 5:
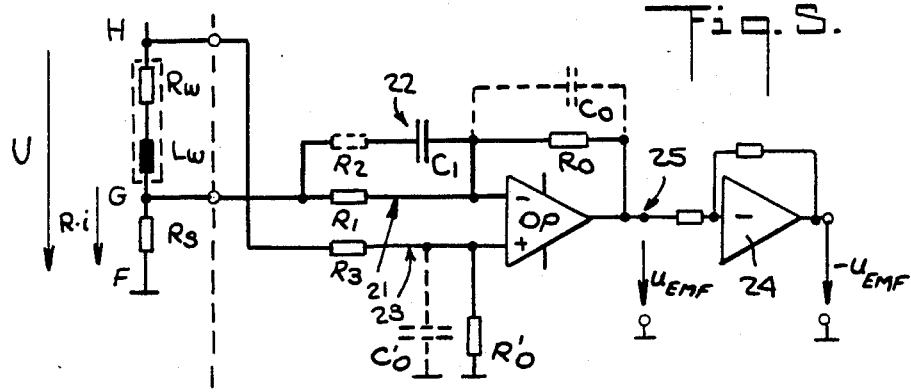
FIGS. 5 and 6 are, respectively, schematic wiring diagrams for the circuitry for two embodiments of a back EMF waveform detector according to the present invention.
Figure 6:
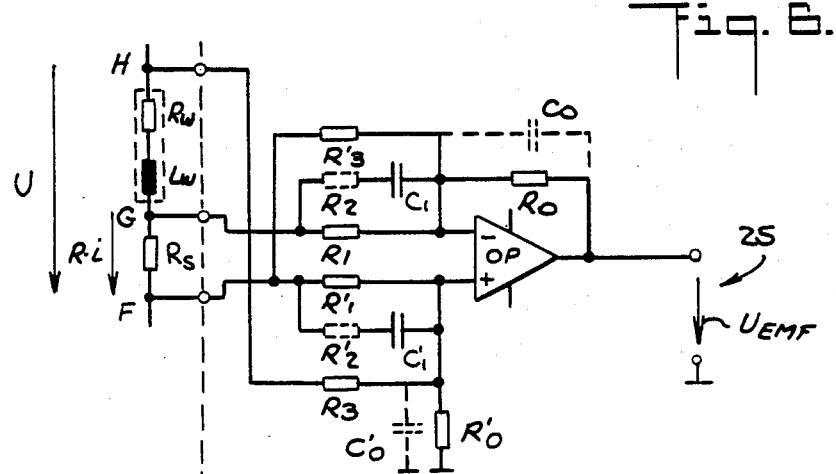

In the embodiment of the invention according to FIGS. 5 and 6, this circuit arrangement is in essence constituted by an analog calculator utilizing only a single operational amplifier. This amplifier is connected as an addition or subtraction amplifier with a differentiating path. It includes a voltage measuring path 21 (iR), a differentiation path 22 with addition $$\left( L \frac{di}{dt} \right),$$

and a subtraction path 23 (−U). Such a detection circuit is provided for each motor phase. Each detector circuit is connected to a motor phase, with a resistance $R_s$ being connected in series with each motor phase winding ($R_w$, $L_w$). It will be apparent, therefore, that the quantity U is the voltage measured across a motor phase winding and its series-connected external resistance, as shown in FIGS. 5 and 6. The circuit arrangement according to FIG. 5 is an especially simple type of detection circuit, in which the external resistance $R_s$ is connected at one terminal to zero potential. This measuring point is designated F. The measuring point G is located at the juncture between the external resistance and the motor phase winding, and the measuring point H is located at the other end of the motor phase winding. Such a circuit arrangement is, by way of example, suitable for unipolar driven step motors with bifilar windings. The voltage $iR_s$, which is proportional to the phase current i and is the drop across the external resistance $R_s$, is measured at the point G. The differentiation is effected over the path 22 before the signal is subjected to the addition operation. The path 23 leads the input voltage to the subtraction operation.

FIG. 6 shows a somewhat modified embodiment of the detection circuit, and in particular one which is constructed as a difference or subtraction circuit. In this case a fixed potential ratio between the values determined at the measuring points F, G and H and the null potential is not required. However, here too use of only a single operational amplifier is found sufficient.

The choice of the operating values of the resistors $R_1$, $R'_1$, $R_3$ and $R'_3$, and of the capacitors $C_1$ and $C'_1$ depends on the ratio of the external resistance to the total resistance and the inductance $L_w$. The resistors $R_2$ and $R'_2$ and the capacitors $C_0$, $C'_0$ function as interference suppression means and are in principle not required for the intended function of the circuit arrangement. It is for this reason that they have been indicated in broken lines.

As has already been mentioned in connection with the description of FIG. 1, in the case of a two-phase motor four back EMF signals are inputted to the back EMF selector device 8. Of these, two signals are the back EMF voltages directly applied to the motor windings, while the other two are back EMF voltages which are the negatives of the first voltages and are 180° out of phase therewith. This is achieved with the aid of an inverter or reversing amplifier 24 which is connected to the output 25 of the associated back EMF detection circuit. This is the arrangement shown in FIG. 5. In like manner (although not expressly illustrated), such a reversing amplifier can also be connected to the output 25 of the detection circuit of FIG. 6.

It will be understood, therefore, that inclusive of the inverter 24 it is sufficient, in the case of a two-phase step motor, to provide for the back EMF detection operation only a single integrated circuit (a four-fold operational amplifier). Switching problems and at the same time space requirements are, consequently, correspondingly minimized. It should be also noted, however, that in essence the detector circuit herein disclosed is not limited to use with step motors, but in principle can also be used for detecting any externally induced voltage in an inductive circuit. Still further, although the description of the herein disclosed embodiments of the present invention has been set forth primarily in terms of two-phase hybrid step motors, the same underlying principles apply analogously to other types of multi-phase motors. The end stages in such cases can be constructed either in the form of bipolar circuits (bridge circuits) or in unipolar form.

Step motors with a control circuitry according to the present invention can be utilized, by way of example, in connection with typing wheel drives of typewriters, high speed return carriage drives of automatic typewriters, record/read head drives for diskette drives, positioning drives in which large paths have to be traversed as rapidly as possible, mirror adjusting drives for optical systems, graph plotting drives, and the like. As has already been mentioned, a large part of the control circuit 1 may be incorporated in a microprocessor 1a, which is schematically indicated in FIG. 1 by the broken-line rectangle surrounding the motor sequencer or counter 3, the PROM 5, the oscillator 13, the frequency detector 14, and the main control 15. Depending on the "capacity" of the microprocessor, of course, the same can also encompass and have integrated therewith still other parts and functions of the overall control circuitry.

What is claimed is:

1. Closed loop control circuitry for a multiphase step motor having at least two phase windings and a magnetic rotor for inducing voltages in said phase windings, which control circuitry includes motor-driver/phase-shifting means, control circuit means including logic switching means for applying signals to said motor-driver/phase-shifting means for effecting a self-synchronous driving of the motor, and a main control for applying signals to said logic switching means, back EMF waveform detector means for sensing the voltage waveforms in said phase windings, and a feedback control loop including said back EMF waveform detector means and said control circuit means, said feedback control loop further including back EMF selector means for receiving the output of said back EMF waveform detector means and for modifying the detected voltage waveforms into different forms assigned to the individual phases of the motor, null point transition detector means, for receiving the modified waveforms from said back EMF selector means and for generating output pulses corresponding to the detected null point transitions of the modified waveforms, and counter means and signal generating means constituting parts of said control circuit means and being connected for receiving the output pulses from said null point transition detector means, said counter means being connected to said main control and said logic switching means;

wherein the improvement comprises that:
(a) said back EMF selector means includes analog switching means operable for passing selected individual ones or combinations of the back EMF waveforms sensed by said back EMF waveform detector means;

(b) said signal generating means includes oscillator means and frequency detector means for delivering signals to said counter means and said main control, respectively; and (c) said feedback control loop further includes adder means interconnected between said analog switching means and said null point transition detector means, said adder means being operable for forming from the selected waveforms passed by said analog switching means addition and subtraction waveforms corresponding to full-step as well as half-step positions of said rotor, and said signal generating means and said counter means being responsive to the output pulses generated by said null point transition detector means, based on said addition and substraction waveforms received from said adder means, for delivering to said main control and said logic switching means control signals which, being determined by the null point transitions, represent the full-step and half-step positions of said rotor and which enable the motor torque to be controlled in dependence on the instantaneous position of the rotor at each part of an operating cycle of the motor.

2. Control circuitry as claimed in claim 1, wherein the improvement comprises that said back EMF detector means includes, for each phase winding, a first output connected to said analog switching means for delivering thereto a signal corresponding to the detected back EMF voltage, and a second output connected to said analog switching means for delivering thereto a signal corresponding to a back EMF voltage which is the negative of and 180° out of phase with said detected back EMF voltage.

3. Control circuitry as claimed in claim 1, wherein the improvement comprises that said null point transition detector means is constructed as a signal comparator.

4. Control circuitry as claimed in claim 1, wherein the improvement further comprises that said logic switching means includes a first control signal output section connected to said motor-driver/phase-shifting means for activating the latter, and a second control signal output section connected to said analog switching means for controlling the latter.

5. Control circuitry as claimed in claim 4, wherein the improvement further comprises that said logic switching means is a PROM.

6. Closed loop control circuitry for a multi-phase step motor having at least two phase windings and a magnetic rotor for inducing voltages in said phase windings, which control circuitry includes back EMF waveform detector means operating in accordance with the equation $U_{EMF}=iR+L(di/dt)-U$ for sensing the voltage waveforms in said phase windings, wherein $U_{EMF}$ is the detected back EMF, R is an external resistance connected in series with a phase winding, i is the current through the phase winding, L is the inductance of the phase winding, and U is the voltage measured across the phase winding and its series-connected external resistance;

wherein the improvement comprises that said back EMF detector means includes a circuit configuration substantially in the form of an analog calculator having fewer than five operational amplifiers incorporated therein.

7. Control circuitry as claimed in claim 6, wherein the improvement further comprises that said circuit configuration of said back EMF detector means has fewer than four operational amplifiers incorporated therein.

8. Control circuitry as claimed in claim 6, wherein the improvement further comprises that said circuit configuration of said back EMF detector means has fewer than three operational amplifiers incorporated therein.

9. Control circuitry as claimed in claim 6, wherein the improvement further comprises that said circuit configuration of said back EMF detector means has only one operational amplifier incorporated therein, said operational amplifier being connected as an addition/subtraction amplifier with a differentiation path and being further provided with a voltage measuring path (iR), a differentiation path with addition $$\left(L\frac{di}{dt}\right),$$

and a subtraction path (−U).

10. Control circuitry as claimed in claim 9, wherein the improvement further comprises that a respective external resistance is connected in series with each phase winding, said voltage measuring path and said differentiation path with addition are connected each at one end thereof to the juncture between a first terminal of said external resistance and a first terminal of the associated phase winding and at the other end to a first input terminal of said operational amplifier, and said subtraction path is connected at one end thereof to a second terminal of said associated phase winding remote from its juncture with said external resistance and at the other end to a second input terminal of said operational amplifier.

11. Control circuitry as claimed in claim 10, wherein the improvement further comprises that said external resistance associated with each phase winding includes an open second terminal remote from said first terminal of said external resistance, and said circuit configuration of said back EMF detector means is such that said back EMF detector means operates as a difference calculator having no fixed potential difference between a zero potential point and the points at which said voltage measuring path, said differentiation path with addition, and said subtraction path are connected to said first and second terminals of said associated phase winding.

12. Control circuitry as claimed in claim 10, wherein the improvement further comprises that said external resistance includes a second terminal remote from said first terminal thereof and connected to a point of zero potential, and said circuit configuration of said back EMF detector means is such that said EMF detector means operates as a calculator having a fixed potential difference between said zero potential point and the points at which said voltage measuring path, said differentiation path with addition, and said subtraction path are connected to said first and second terminals of said associated phase winding.

13. Control circuitry as claimed in claim 10, wherein the improvement further comprises that an inverter or reversing amplifier is connected to an output terminal of said operational amplifier for generating a back EMF signal having an arithmetic sign opposite to the arithmetic sign of the back EMF signal input to said operational amplifier.

14. Control circuitry as claimed in claim 13, and which includes analog switching means constituting back EMF selector means, wherein the improvement further comprises that said back EMF detector means includes, for each phase winding, a first output terminal connected to said analog switching means for delivering thereto a signal corresponding to the detected back EMF voltage waveform, and a second output terminal connected to said analog switching means for delivering thereto a signal corresponding to a back EMF voltage waveform which is the negative of and 180° out of phase with said detected back EMF voltage waveform.

15. Control circuitry as claimed in claim 14, and which includes null point transition detector means for receiving output signals from said back EMF selector means, wherein the improvement further comprises that adder means are interconnected between said analog switching means and said null point transition detector means, said adder means being operable for forming from the selected waveforms passed by said analog switching means addition and subtraction waveforms corresponding to full-step as well as half-step positions of said rotor, and said null point transition detector means is constructed as a signal comparator and provides output pulses corresponding to the detected null point transitions of said addition and subtraction waveforms.

16. Control circuitry as claimed in claim 15, wherein the improvement further comprises that damper means and associated integrator means are connected to said adder means, said integrator means being adapted to be selectively activated and deactivated in response to appropriate signals being received thereby from said adder means, and said integrator means being operable, when activated by a signal from said adder means, to provide an output which is representative of the then-existing energy state of said rotor and is applied to said damper means to activate the same for initiating the required degree of damping of said rotor.

17. Control circuitry as claimed in claim 16, and which includes motor-driver/phase-shifting means for driving said rotor, and control circuit means including logic switching means for applying signals to said motor-driver/phase-shifting means, wherein the improvement further comprises that said damper means has two control inputs and one control output, one of said control inputs being connected for receiving from said adder means signals representing back EMF voltage waveforms generated by said adder means and lying in phase with the holding torque curve of the motor, the other of said control inputs being connected for receiving from said main control signals representing the last occurring energization state shift of said phase windings in a given operating cycle of the motor, and said control output being connected for applying to said logic switching means, when said integrator means is activated by a signal from said adder means, an output which triggers said logic switching means to effect a further shifting of the phase windings from said last occurring energization state to the next succeeding energization state.

18. Control circuitry as claimed in claim 16 or 17, wherein the improvement further comprises that said integrator means is connected for selective activation and deactivation in response to the null point transitions of back EMF voltage waveforms or waveform combinations through the rotor end position axis, and the output of said integrator means is representative of the energy state of said rotor during the first overrunning stage thereof.

19. Control circuitry as claimed in claim 18, wherein the improvement further comprises that said damper means is connected to provide, corresponding to the output of said integrator means subsequent to the first overrunning by said rotor of its desired end position and at the time of the largest amplitude of said overrunning, a signal for effecting an energization state conductive to further rotation of said rotor and in opposition to a return swinging movement thereof for a time interval proportional to said output of said integrator means.

* * * * *